United States Patent [19]

Dörreich

[11] Patent Number: 4,483,875
[45] Date of Patent: Nov. 20, 1984

[54] ENZYMATIC TREATMENT OF POMACE
[75] Inventor: Kurt A. Dörreich, Basel, Switzerland
[73] Assignee: Novo Industri A/S, Denmark
[21] Appl. No.: 491,182
[22] Filed: May 3, 1983
[51] Int. Cl.$^3$ .................................................. A23B 7/10
[52] U.S. Cl. ............................................. 426/52; 426/51
[58] Field of Search ................ 426/49, 51, 52, 599; 435/615, 267, 272, 913

[56] References Cited

U.S. PATENT DOCUMENTS

| | | | |
|---|---|---|---|
| 3,083,104 | 3/1963 | Celmer | 426/599 |
| 3,754,932 | 8/1973 | Baker et al. | 426/51 |
| 4,275,648 | 6/1981 | Mouri et al. | 426/51 |
| 4,299,849 | 11/1981 | Mouri et al. | 426/599 |
| 4,371,552 | 2/1983 | Posorske | 426/52 |

FOREIGN PATENT DOCUMENTS

| | | | |
|---|---|---|---|
| 2206015 | 8/1973 | Fed. Rep. of Germany | 426/49 |
| 0011264 | 1/1979 | Japan | 426/51 |
| 0125393 | 4/1977 | U.S.S.R. | 426/51 |

Primary Examiner—Raymond Jones
Assistant Examiner—Marianne S. Minnick
Attorney, Agent, or Firm—Fidelman, Wolffe & Waldron

[57] ABSTRACT

Treatment of pomace or comminuted suspension of whole fruits and vegetables with SPS-ase alone or combined with cellulase to increase juice yield and improve separation of residual pomace solids from juice product.

5 Claims, 1 Drawing Figure

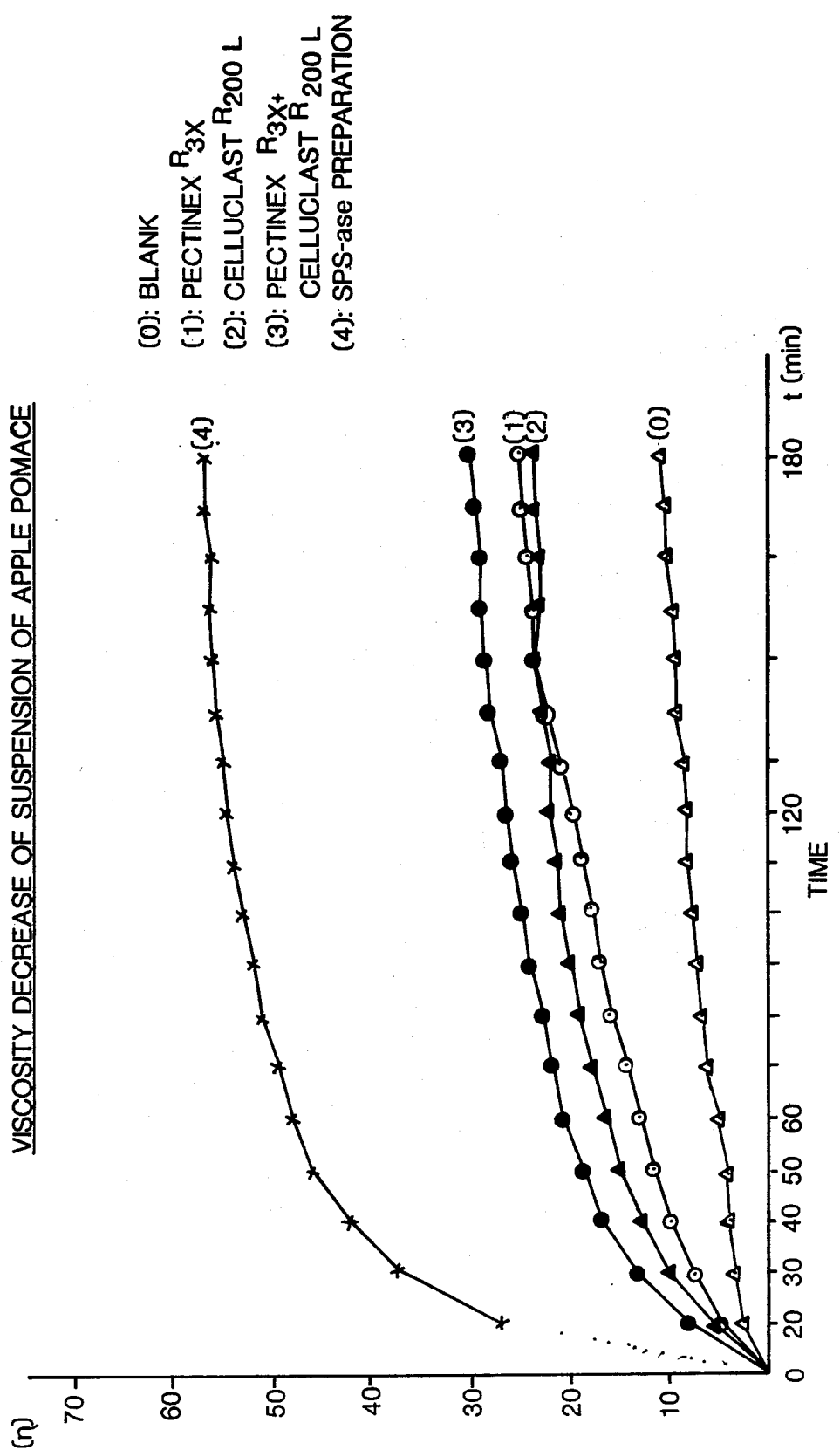

ENZYMATIC TREATMENT OF POMACE

This invention relates to the enzymatic treatment of pomace and in particular to treatment of pomace with SPS-ase.

Preparation of juice from fruits such as pears, apples, grapes, oranges, berries, and the like or vegetables such as tomatoes, etc. is usually carried out by pressing the juice from the fruit or vegetable, leaving behind a solid residue of skin, pulp, seeds if present, and the like. All such residues are identified herein by the term "pomace".

The art has long since recognized that considerable juice is adsorbed or otherwise bound to the pomace after the first pressing. Such suggestions range from the thought to conduct a second pressing to relatively complex schemes involving enzymatic treatment of the starting material or the pomace. Suggestions have even been made also to totally liquefy the fruit or vegetable enzymatically so as to produce a juice product and a reduced proportion of solid residue.

However, total liquefaction of fruits or vegetables, requires a considerable enzyme dosage, and for juicing purposes, more economic processing is obtainable by generating both juice and a solid residue. The process of this invention involves juicing under circumstances wherein an easy to separate solid residue remains.

Substantial, albeit incomplete, expression of juice from fruits or vegetables can be obtained by a simple pressing, e.g., a press and a cloth or wire screen, to separate the juice product from the pomace. Characteristically, the juicing arts employ relatively simple, even crude equipment for the first pressing. However, treatment of the pomace from the first pressing, a second pressing so to speak, requires relatively complex equipment for best results, e.g. presses or centrifugal separators. The pomace from a first pressing is characteristically a highly viscous, often gelatinous mass from which additional juice can be expressed only with difficulty. If the pomace is resuspended in juice or water to form a viscous mass, then treated with enzymes, the apparent viscosity of the viscous mass decreases slowly, if at all. Release of juice from pomace solids through enzymatic action is not facilitated sufficiently to avoid need to use relatively complex juice recovery equipment such as presses or centrifugal separators. The teachings in U.S. Pat. No. 4,275,648 can be pointed to as typical of the relatively complex processing sequences and equipment suggested to the art for improving juice yield by a second pressing. In a preferred mode thereof, the process of this invention is directed to enzymatic treatment of the pomace from a first pressing.

To a great extent, the difficulties facing the juicing art are believed to be due to the inadequacies of conventional enzymes available to the juicing arts, such as cellulases, pectinases, hemicellulases. The enzymes heretofore available to the art are inactive or relatively slow-acting on carbohydrates that generate high viscosity, fluid-retaining characteristics to the pomace. Enzymatic treatment of pomace has required relatively long treatment times. Viscosity decrease in the viscous mass consisting of pomace and added aqueous medium has been relatively slow. All told, a relatively low throughput rate for the second pressing results from treatment with available conventional enzymes, even when relatively sophisticated separation equipment is employed.

Thus, the object of the invention is to provide a method for enzymatic treatment of pomace by means of which the treatment time of the pomace can be significantly reduced, the viscosity decrease rate of the viscous mass consisting of pomace and aqueous medium can be significantly increased and the throughput in relation to the pressing operation subsequent to the pomace treatment can be significantly increased.

Now, according to the invention, surprisingly, it has been found that the above-indicated object is fulfilled, if an SPS-ase preparation is used for the enzymatic treatment.

Thus, the invention comprises a method for enzymatic treatment of pomace originating from fruits or vegetables by addition of sufficient aqueous medium to convert the pomace into a flowable viscous mass and by addition of the SPS-ase preparation described in U.S. patent application, Ser. No. 334,329, filed Dec. 24, 1981.

Preferably, enzyme treatment is carried out at the natural pH occuring in the aqueous suspension of pomace. If pH adjustment is carried out, care should be taken to use the least possible buffer to adjust pH. Otherwise, a needlessly excessive amount of buffer salts will accompany the extract phase and will become an unwanted component of the juice product.

As is demonstrated by the data provided in the following examples, treatment of pomace with SPS-ase can increase the juice yield and facilitate separation of the juice product from the residual pomace solids.

In a preferred embodiment of the method according to the invention the SPS-ase preparation employed is that of *Aspergillus aculeatus* CBS 101.43. CBS is Centraalbureau voor Schimmelcultures, Baarn, The Netherlands. With this enzyme it is possible to obtain high juice yield and good separation characteristics.

In another preferred embodiment of the method according to this invention, the concentration of SPS-ase employed for the treatment corresponds to an SPS-ase activity in MOU units of 100–2000 MOU units per kg of pomace (wet pressed basis) or whole fruit and preferably 200–1000 MOU units/kg.

Application of excessive enzyme would waste the enzyme. The MOU activity unit will be defined hereinafter. The MOU activity is not an activity in U.S. patent application, Ser. No. 334,329, filed Dec. 24, 1981.

In another preferred embodiment of the method according to the invention, the treatment with the SPS-ase preparation is carried out at a temperature between 10° C.–65° C., preferably between 20° C.–30° C. or 45° C.–55° C. In this temperature range, a high level of enzymatic activity combined with a reasonably good enzyme stability is obtained, whereby high juice yield and a residue that readily separates from the juice can be obtained with a relatively short enzyme treatment time. The interval between 30° C.–45° C. is less preferred for fear of microbial contamination. The 20° C.–30° C. interval is most preferred since the 45° C.–55° C. may generate an off taste in the juice product.

In another preferred embodiment of the method according to the invention, the enzyme treatment time is set to ensure an optimum juice yield. Obviously, the relation of enzyme treatment time to juice yield and to the characteristics of the residual solids depends on enzyme dosage and treatment temperature. For any given fruit or vegetable, treatment time is longer with decreasing enzyme dosage and with decreasing temperature. Also, the treatment time depends upon the particle size and if the pomace is a solid, e.g. citrus rind, or more of a mush, e.g., apples. Cut and try tests, employing, if desired, the viscosity reduction standard hereinafter provided can establish a reasonable optimum between juice yield and separation characteristics for any particular fruits or vegetables pomace within the range of ten (10) minutes to fifteen (15) hours, preferably thirty (30) minutes to three (3) hours contemplated for practice of this invention.

DETAILED DISCUSSION OF THE INVENTION

As has been pointed out, the overall rationale of this invention is to obtain a secondary juice product out of the pomace from a first pressing and at the same time to convert the pomace solids into a form that separates readily from the secondary juice product. The term, pomace, is intended in a generic sense to include the various pomaces such as grape and apple pomaces as well as comparable residues like citrus rind or peel, etc., just as the term first pressing is intended to include the pressings, squeezings, crushings, etc. of fruits and vegetables to generate a juice product.

Reduction in the viscosity of the (thick) aqueous pomace suspension which is, of course, important to recovery of the juice, rapidly occurs upon treatment by the SPS-ase preparation. Some care must be taken when enzyme dosage levels are set.

Desirably, dosage and treatment conditions are preset to reduce viscosity of the liquid in the suspension to about the viscosity of the primary juice product.

It must be appreciated that the SPS-ase preparation contains other carbohydrase activities besides SPS-ase, including notably pectinase, cellulase, and hemicellulase activities.

Residual solids in the enzyme treated suspension are far less gelatinous than a first pressing pomace, and are more easily separated.

The same press, screen etc. employed for the first pressing may be used for recovering the secondary juice product. Use of more sophisticated equipment for such recovery is of course not included.

However, it is believed that the cellulase activity present in the SPS-ase preparation alone or with other carbohydrase activity helps release juice constituents from the pomace. See, for example, the suggestion made by U.S. Pat. No. 4,371,552 to employ cellulase alone or with pectinase in the conversion of prune into prune juice.

The refractory nature of cellulose will, on occasion, make desirable the presence of additional cellulase activity for enzymatic treatment of pomace, albeit that complete hydrolysis of cellulose is not desired. Within contemplation of the invention hereof, is treatment of pomace with both SPS-ase preparation and modest amounts of cellulase, i.e., 20–200 CAVU/kg of pomace or fruit. (See Novo Enzymes "Celluclast"-B 153c/GB 1000 July 1981.

Although the discussion of this invention has been posed in terms of treatment of the pomace removed from a first pressing it should be appreciated that practice of the invention includes within its contemplation treatment of comminuted whole fruit suspended in the juice thereof. In effect, milling converts the whole fruit or vegetable into a suspension of pomace in juice. Such suspension of pomace in (an aqueous) juice is little different than a suspension of pomace in tap water. Indeed, as is demonstrated by Example 1, hereinafter, the advantages that accrue from practice of this invention can most easily be demonstrated by enzyme treatment of whole fruits or vegetables. With regard to contemplation herein to employ treatment of SPS-ase in a first pressing liquefaction as well as on pomace, it may be noted that aid enzymes has been considered for obtention of a wide variety of juices. See, for example, Rombouts and Pilnik "Process Biochemistry", August 1978, pp. 9–13, and how the teachings in U.S. Pat. No. 4,275,648 are applied to whole fruit as well as a pomace residue.

EXAMPLE 1

Industrial liquefaction of apple mash 20 tons of apples have been milled by means of a Bucher Central mill (6 mm knives), and liquefied at 20° C. for 2 hours under continuous stirring with 4 kg SPS-ase preparation, batch SP 254 (KRF 68+KRF 92, 1:1, both described in detail in Ser. No. 334,329 filed Dec. 24, 1981). 3880 MOU/g. The so prepared mash was separated by means of a Bucher press HP 5000 into 18,210 l of juice and 1,790 kg of pomace. The Brix content in the juice increased from originally 12,1 Bx to 12,9 Bx.

Using the same raw material in the conventional process without enzyme treatment, 14,730 l of juice was pressed out of the mash and 5,270 kg pomace remained in the press. The Brix content of the juice was 12,1 Bx.

EXAMPLE 2

As a substrate apple pomace was used which was produced in the following way:

Apples were coarsely milled with a Bucher Central mill (4 mm). The apple mash was pressed until 75% of juice (weight/weight) was obtained. The resulting pomace was suspended in the double amount of water and then milled on a Fryma mill with a coround stone outfit and a fissure of 0.5 mm.

Enzyme reactions were carried out at 50° C. for 3 hours in the Contraves Epprecht Rheomat 15. During stirring continuous viscosity measurements were carried out, and the viscosity expressed as a percentage of the original viscosity was determined (speed setting 15).

Table 1 and FIG. 1 show a comparison between the effect of Pectinex ® 3X (2550 MOU/g), Celluclast ® 1.5 L, the combination of Pectinex ® 3X and Celluclast ® 1.5 L and an SPS-ase preparation. The SPS-ase preparation used in these test corresponded to the SPS-ase preparation described in Example 1 in Ser. No. 334,329 without base treatment and with the following enzyme activities:

| | | |
|---|---|---|
| SPSU/g | = | 40 |
| SRU/g | = | 205 |
| PGE/g | = | 9560 |
| HUT at pH 3,2/g | = | 3200 |
| VHCU/g | = | 256,000 |
| MOU/g | = | 988 |

The results appear from the following table 1 and the attached FIG. 1.

TABLE 1

Viscosity decrease of apple pomace suspension in percent
(Comparison of enzyme on equal MOU basis;
Epprecht Rheomat 15, speed setting 15)

| Time (min) | Blank (0) | Pectinex$^R$3X (1) | Celluclast$^R$1.5 L (2) | Pectinex$^R$3X + Celluclast$^R$1.5 L (3) | SPS-ase preparation (4) |
| --- | --- | --- | --- | --- | --- |
| 0 | 0 | 0 | 0 | 0 | 0 |
| 10 | 2,5 | 5,0 | 6,0 | 8,0 | 27,0 |
| 20 | 3,5 | 7,5 | 10,0 | 13,5 | 37,0 |
| 30 | 4,0 | 10,0 | 13,0 | 17,0 | 42,0 |
| 40 | 4,5 | 11,5 | 15,5 | 19,0 | 46,0 |
| 50 | 5,0 | 13,0 | 16,5 | 21,0 | 48,0 |
| 60 | 6,0 | 14,5 | 18,0 | 22,0 | 49,5 |
| 70 | 6,5 | 16,0 | 13,0 | 23,0 | 51,0 |
| 80 | 7,0 | 17,0 | 20,0 | 24,5 | 52,0 |
| 90 | 7,5 | 18,0 | 21,0 | 25,0 | 53,0 |
| 100 | 8,0 | 19,0 | 21,5 | 26,0 | 54,0 |
| 110 | 9,0 | 20,0 | 22,0 | 26,5 | 54,5 |
| 120 | 9,5 | 21,0 | 22,0 | 27,0 | 55,0 |
| 130 | 9,0 | 22,0 | 22,5 | 28,0 | 55,5 |
| 140 | 9,0 | 23,0 | 23,0 | 28,5 | 56,0 |
| 150 | 9,5 | 23,5 | 23,0 | 29,0 | 56,0 |
| 160 | 10,0 | 24,0 | 23,0 | 29,0 | 56,0 |
| 170 | 10,0 | 24,5 | 23,5 | 29,5 | 56,5 |
| 180 | 10,5 | 25,0 | 23,5 | 30,0 | 56,5 |

Appendix to Table 1:
(0): blank
(1): 30 g Pectinex$^{(R)}$3X/100 kg pomace
(2): 60 g Celluclast$^{(R)}$1.5 L/100 kg pomace
(3): 30 g Pectinex$^{(R)}$3X + 60 g Celluclast$^{(R)}$1.5 L/100 kg pomace
(4): 77,4 g SPS-ase preparation/100 kg pomace
Pectinex$^{(R)}$3X: 2'550 MOU/g
SPS-ase preparation: 988 MOU/g

EXAMPLE 3

Liquefaction of apple pomace originating from stored apples (Jonathan and Boskop)

Apples were milled with a Bucher Central mill (4 mm) and the mash pressed after a mash treatment with Pectinex® (20 g Pectinex® 1X/100 kg apples, one hour, room temperature) with a Bucher horizontal press until 78% juice was obtained. 0,667 kg of the resulting pomace was suspended in 1,333 kg water, heated to 50° C. The same SPS-ase preparation used in Example 2 was added (20 g/100 kg pomace) during stirring. After combined stirring for 2 hours the mash was pressed with a Hafico HP5M press. 1,510 kg "juice" with 5,5° Brix was obtained.

EXAMPLE 4

Industrial liquefaction of apple pomace

To 6000 kg apple pomace, which was received from a conventional processing fruit juice plant (Bucher Central mill: 6 mm, mash treatment: 10 g Pectinex® 1X/100 kg apples Bucher HP 5000 press) 12,000 liter hot water (condensate from the concentrator) was added and a mixture temperature of 55° C. was achieved. Then 1.2 kg of the SPS-ase of Example 2 was added.

After two hours of slight stirring the mass was pressed with a Bucher HP 5000 press, similar to a press used for processing of normal apple mashes. The weight of the second pomace was 3700 kg and 14,300 lit. juice with 4,5° Brix was obtained.

Comparable tests made on carrots, cranberries, pears, red and black currants, confirmed that the SPS-ase is many times more effective than pectinase and/or cellulase alone.

In the tests from which the examples are drawn the pectinase (Pectinex ®) and the SPS-ase were used in concentrations which generated the same activity in MOU units/kg pomace measured according to the method in "Determination of the Pectinase Units on Apple Juice (MOU)" of Dec. 6, 1981, available from Schweizerische Ferment AG, Vogesenstrasse 132, Basle, Switzerland.

I claim:

1. A method for treating pomace in the form of a first pressing pomace suspended in an aqueous medium or in the form of comminuted whole fruit or vegetable suspended in the juice thereof which comprises treating the suspension with an SPS-ase preparation in activity of from 100–2000 MOU units per kilogram of suspension, said SPS-ase being characterized as capable of degrading the water-soluble polysaccharide which binds to soy protein, and thereafter separating the juice product from the residual solids.

2. The method of claim 1 including concurrently treating the suspension with cellulase in activity of from 20 to 200 CavU per kilogram of suspension.

3. The method of claim 1 wherein the SPS-ase preparation is from *Aspergillus aculeatus* CBS 101.43.

4. The method of claim 1 wherein treatment temperature is in the range of 10° C.–65° C.

5. The method of claim 1 wherein treatment time is in the range of ten minutes to fifteen hours.

* * * * *